(12) United States Patent
Ohshio (10) Patent No.: US 6,491,419 B1
(45) Date of Patent: Dec. 10, 2002

(54) VEHICLE HEADLAMP

(75) Inventor: Hirohiko Ohshio, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 39 days.

(21) Appl. No.: 09/685,848

(22) Filed: Oct. 10, 2000

(30) Foreign Application Priority Data

Oct. 12, 1999 (JP) ............................................ 11-289399

(51) Int. Cl.[7] ............................................ F21W 101/10
(52) U.S. Cl. ........................ 362/539; 362/513; 362/538
(58) Field of Search ................................ 362/512, 513, 362/538, 539, 282, 277, 322, 324

(56) References Cited

U.S. PATENT DOCUMENTS

| | | |
|---|---|---|
| 5,213,406 A | 5/1993 | Neumann et al. ............. 362/61 |
| 5,488,546 A * | 1/1996 | Sato et al. ..................... 362/61 |
| 6,312,147 B2 * | 11/2001 | Eichler ......................... 362/539 |
| 2001/0010634 A1 * | 8/2001 | Yokoi .......................... 362/539 |

FOREIGN PATENT DOCUMENTS

| | | | |
|---|---|---|---|
| GB | 2332742 A | 6/1999 | .......... B60Q/1/076 |
| GB | 2341672 A | 3/2000 | ............ B60Q/1/14 |
| GB | 2341673 A | 3/2000 | ............ B60Q/1/14 |

* cited by examiner

Primary Examiner—Laura K. Tso
(74) Attorney, Agent, or Firm—Fish & Richardson P.C.

(57) ABSTRACT

A beam switching device 24 is provided for switching between a low beam and a high beam by rotating a shade 22 for screening part of incident light given off from a discharge illuminant portion 18a to a reflecting surface 20a of a reflector 20. The shade 22 rotates about a rotational axis A extending in a direction which inclines a predetermined angle Θ relative to a horizontal plane. A rotational locus of the shade 22 can be inclined relative to a vertical plane. The beam switching device 24 can also be inclined relative to the vertical plane. Thus, a vertical dimension h from an optical axis Ax to a lower end f the beam switching device 24 is made short.

14 Claims, 7 Drawing Sheets

FIG. 5(a)
LOW BEAM

FIG. 5(b)
HIGH BEAM

VEHICLE HEADLAMP

FIELD OF THE INVENTION

The present invention relates to a vehicle headlamp constructed to switch beams by moving a movable shade.

BACKGROUND OF THE INVENTION

A vehicle headlamp is constructed such that a beam for low beam or high beam is emitted by reflecting forward light from a light source with a reflector. Since light distribution patterns required for the low beam and the high beams are different, in general, two light sources are selectively switched on or off such that the headlamp switches between the low beam and the high beam.

However, there are vehicle headlamps constructed to switch beams using a single light source. In particular, such construction is found with many two-unit type headlamps, which have a discharge bulb as a light source bulb.

One conventional beam switching method that uses a single light source switches beams with a movable shade. In this method, the shade is designed to move between two positions each providing a different degree of screening of incident light given off from a light source to a reflector with a beam switching device comprising an actuator such as a solenoid.

When the movement of the shade is performed through a rotational motion, the shade is constructed to rotate about a rotational axis extending horizontally by the beam switching device disposed below the light source.

However, if the shade is constructed to rotate about the rotational axis extending horizontally, its vertical dimension from the light source to a lower end of the beam switching device must be increased. Because of this, for a lamp in which the vertical width of a reflector below a light source of the lamp is narrow and the lower end portion of the beam switching device protrudes below the reflector, the lamp would have to be made large to contain the protruding portion.

The present invention was made in view of these situations. An object thereof is to provide a vehicle headlamp constructed such that beams are switched by rotating a shade. A beam switching device can be incorporated in the headlamp without unnecessarily making the headlamp large.

SUMMARY OF THE INVENTION

The present invention attains the above object by devising the orientation of a rationale axis for the shade.

According to an embodiment of the invention, there is provided a vehicle headlamp comprising a light source, a reflector for reflecting forward light from the light source, a shade for screening part of incident light given off from the light source to the reflector and a beam switching device for switching between a low beam and a high beam by rotating the shade between two positions providing respectively a different degree of screening of the incident light by the shade. The beam switching device is constructed so as to rotate the shade about a rotational axis extending in a direction that is inclined at a predetermined angle relative to a horizontal plane.

The kind of the above "light source" is not limited to any specific one, but may be a discharge illuminant portion of a discharge bulb or a filament of an incandescent bulb such as a halogen bulb.

The "shade" may be a shade of any type and no specific construction is required therefor, provided that the shade can screen part of incident light given off from the light source to the reflector.

There is no specific limitation imposed on the "predetermined angle." However, if this is set to a large value, the vertical dimension from the light source to the lower end position of the beam switching device can be made shorter. If the angle is set to a value too large, the shade and a rotating mechanism portion of the beam switching device may interfere with a reflecting surface area of the reflector to adversely affect the light distribution of the lamp. Therefore, the "predetermined angle" may be set to a suitable value that achieves a good balance between those two factors.

As shown in the foregoing construction, the Vehicle headlamp according to the invention comprises the beam switching device for switching between the low beam and the high beam by rotating the shade for screening part of incident light given off from the light source to the reflector between two positions providing respectively a different degree of light screening. The beam switching device is constructed so as to rotate about the rotational axis extending in the direction that is inclined at a predetermined angle relative to the horizontal plane. Consequently, the following function and effectiveness can be obtained.

The rotational locus of the shade can be inclined relative to the vertical plane by inclining the rotational axis of the shade relative to the horizontal plane. Along with this, the beam switching device can also be inclined relative to the vertical plane. Therefore, the vertical dimension from the light source to the lower end position of the beam switching device can be made shorter.

As mentioned previously, there is no specific limitation to the magnitude of the "predetermined angle." If it is set between 30 to 60 degrees, the vertical distance between the light source to the lower end position of the beam switching device can be made shorter without adversely affecting the light distribution of the lamp.

In general, a non-light incident area on a reflector where light from a light source is not permitted to enter varies as a shade rotates. In a case where a rotational axis of the shade inclines relative to the horizontal plane as in the case of the construction described above, the variation of the non-light incident area differs between reflecting surfaces on left and right sides of the light source. The variation is larger at the reflecting surface on one side (left or right side) than at the reflecting surface on the other side where the rotational axis is disposed.

In the construction described above, when the shade is located at the low beam position and the non-light incident area is set such that this area is larger at one side of the reflecting surface of the light source than at the other side of the reflecting surface where the rotational axis is disposed, not only the non-light incident area can be used as a light incident area when the shade is located at the high beam position but also a rotational angle of the shade required for beam switching can be set to a small value. Thus, the beam switching device can be made compact.

Here, the "low beam position" refers to one of the two positions which provides a larger degree of screening, while the "high beam position" refers to the other position which provides a smaller degree of screening.

DETAILED DESCRIPTION OF THE INVENTION

Referring to the accompanying drawings, an embodiment of the invention will be described below.

Figure 1:
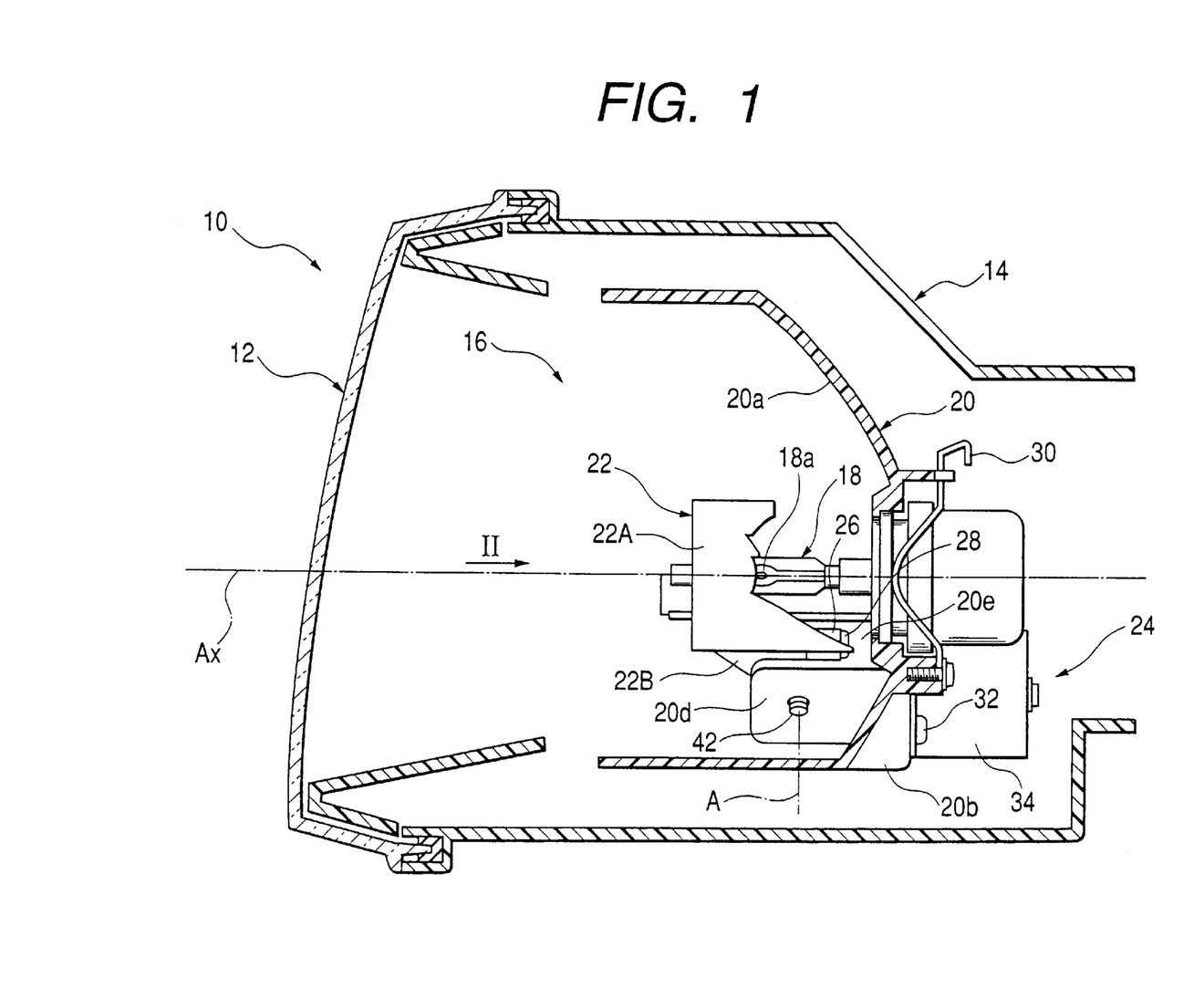
FIG. 1 is a side sectional view showing a vehicle headlamp according to one embodiment of the invention.
Figure 2:
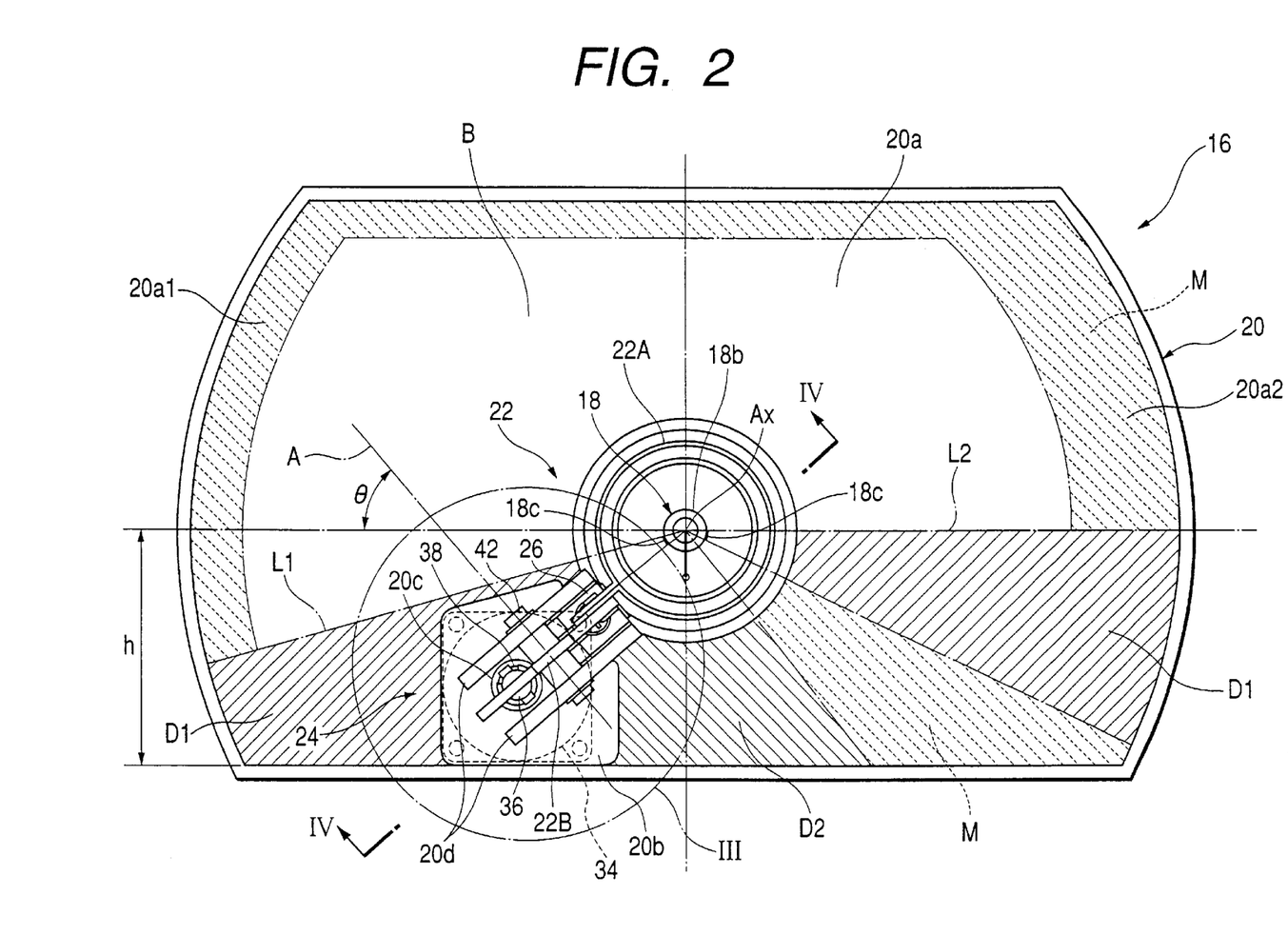
FIG. 2 is a view in a direction designated by an arrow III in FIG. 1.
Figure 3:
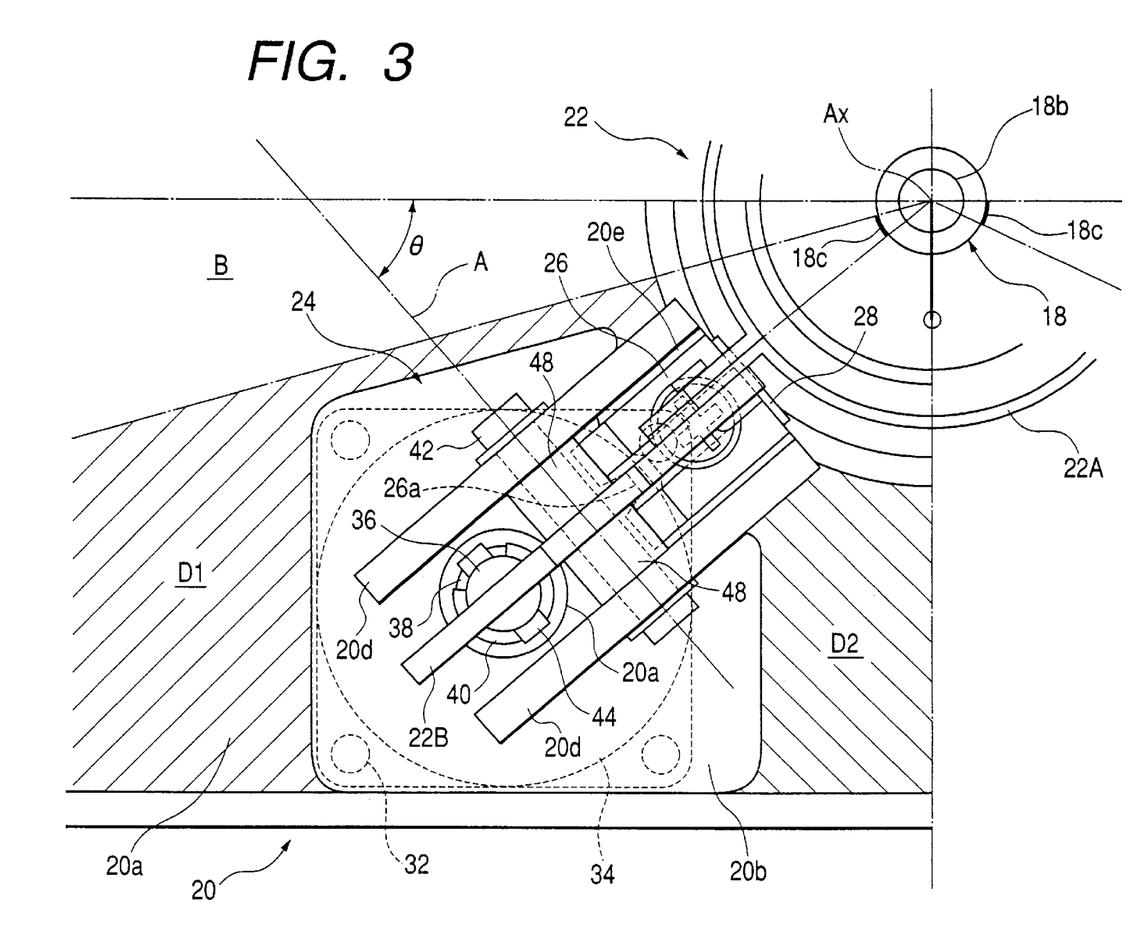
FIG. 3 is a detailed view of a portion designated as III in FIG. 2.

FIG. 1 is a side sectional view showing a vehicle headlamp according to one embodiment of the invention. FIG. 2 is a view in a direction indicated by an arrow II in FIG. 1. FIGS. 3 and 4 are a detailed view of a portion designated as III and sectional views along the line IV—IV in FIG. 2, respectively.

As shown in FIG. 1, in a vehicle headlamp 10 according to an embodiment of the invention, a reflector unit 16 is provided so as to tilt vertically and transversely via an aiming mechanism, not shown, within a lamp chamber constituted by a lens 12 and a lamp body 14.

The reflector unit 16 comprises a discharge bulb (a metal halide bulb) 18, a reflector 20, a shade 22 and a beam switching device 24.

The lens 12 is a transparent lens and a light distribution control function is imparted to the reflector unit 16. That is, the reflector 20 has a reflecting surface 20a for reflecting forward light from a discharge illuminant portion 18a (a light source) of the discharge bulb 18. A beam for forming a predetermined light distribution pattern is designed to be emitted forward through the divergence by the reflecting surface 20a or deflection reflection function.

The discharge bulb 18 is inserted in a rear apex portion of the reflector 20 to be secured in place in such a manner that the discharge illuminant portion 18a is positioned on an optical axis Ax of the reflector 20 and is then fixed to the reflector 20 by means of a linear spring 30.

The shade 22 comprises a cylindrical shade main body 22A whose rear end is formed into a complicated irregular configuration and a plate-like stay 22B extending from a diagonally lower end portion of the shade main body 22A diagonally, downwardly, and slightly toward the rear of the shade main body, the shade main body 22A and the stay 22B being fixed together with a rivet or rivets.

Figure 4A:
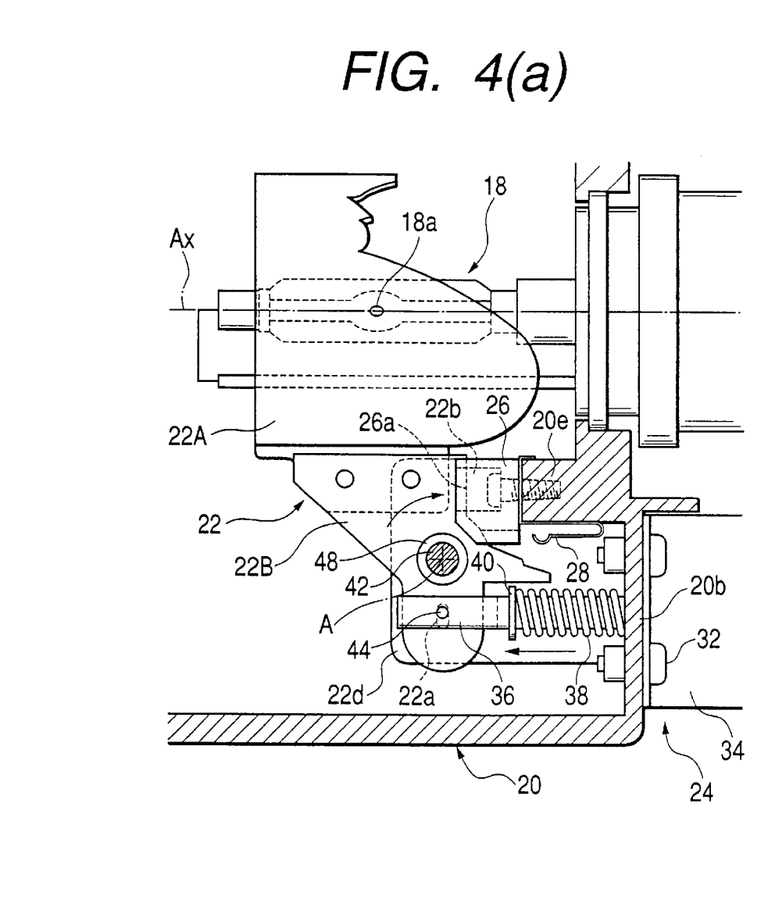
FIG. 4 is a sectional view along the line IV—IV in FIG. 2.
Figure 4B:
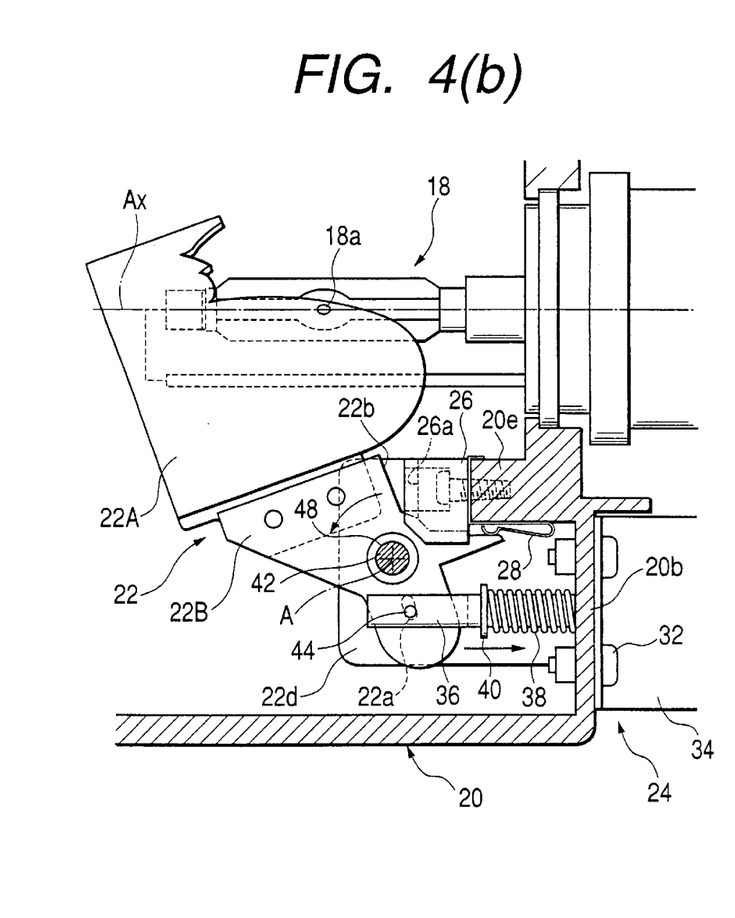

The beam switching device 24 causes the shade 22 to take a low beam position shown in FIG. 4A and a high beam position shown in FIG. 4B. When located at the low beam position, the shade 22 is designed to screen with the shade main body 22A part of light given off from the discharge illuminant portion 18a of the discharge bulb 18 to the reflecting surface 20a of the reflector 20. This design allows only light needed for the illumination of the low beam to enter the reflecting surface 20a. Whereas when at the high beam position, the shade 22 is designed to reduce the degree of screening of the incident light to the reflecting surface 20a by the shade main body 22A to secure an amount of light needed for the illumination of the high beam.

As shown in FIGS. 1 to 4, the beam switching device 24 is provided at a diagonally lower position relative to the optical axis Ax of the reflector 20. This diagonally lower location relative to the optical axis Ax of the reflector 20 is formed as an expanding portion 20b expanding rearward relative to the reflecting surface 20a. The beam switching device 24 comprises a solenoid 34 fixed to this expanding portion 20b from the rear with a screw 32 and a return spring 38 attached to a movable core 36 of the solenoid 34 for biasing the movable core 36 toward a non-excited position.

These movable core 36 and the return spring 38 are provided in such a manner that they are inserted through an insertion through hole 20c formed in the expanding portion of the reflector 20. An E-ring 40 is provided at an intermediate portion of the movable core 36 so as to come into abutment with a front end of the return spring 38 to receive the elastic biasing force of the return spring 38, and a distal end thereof is bifurcated.

The shade 22 is supported by a pair of ribs 20d formed so as to protrude forward from the expanding portion 20b of the reflector 20 in such a manner as to rotate about a rotational axis A at an intermediate portion of the stay 22B thereof via a shaft member 42. This rotational axis A extends within a vertical plane intersecting at right angles with the optical axis Ax in a direction that is inclined at an angle of Ø (Ø=50 degrees) relative to a horizontal plane. Annular spacers 48 are mounted between the stay 22B and the two ribs 20d, respectively. The looseness generated between the stay 22B and the shaft member 42 is designed to be suppressed to a minimum.

Additionally, the shade 22 is connected via a pin 44 to a distal end of the movable core 36 at a distal end of the stay 22B thereof. This connection is effected by fixing the distal end of the stay 22B to the distal end of the movable core 36 by holding the distal end of the stay 22B from both sides thereof by the bifurcated distal ends of the movable core 36 therebetween and allowing the pin 44 to pass through the distal ends of the stay 22B and the movable core 36 in the rotational axis direction. An elongated hole 22a is formed in the distal end of the stay 22B in such a manner as to extend in a radial direction relative to the optical axis Ax for allowing the pin 44 to be inserted therethrough. A change in distance between the shaft member 42 and the pin 44 is designed to be absorbed which would be generated as the shade rotates.

A projecting portion 20e is formed on the expanding portion 20b of the reflector 20 at a position closer to the optical axis Ax which projects forward between the two ribs 20d. Then, a displacement control block 26 is fixed to the projecting portion 20e via a displacement control spring 28 by fastening from the front with a screw. This displacement control block 26 is constituted by a member made from a resin (for example, a fluorine system resin) which reduces production of noise, and a V-shaped groove 26a is formed from a front end face to a lower end face of the block 26.

The switching between a low beam and a high beam by the beam switching device 24 is described below.

When a beam selector switch (not shown) of the beam switching device 24 is at an OFF position, the movable core 36 of the solenoid 34 is in a non-excited condition, and the movable core 36 moves forward by virtue of the elastic biasing force of the return spring 38. The stay 22B of the shade 22 rotates about the rotation axis A rearward to a position where the stay 22B comes into abutment with the front end face of the displacement control block 26, where the stay 22B is fixed in place at the low beam position as shown in FIG. 4A. On the other hand, when the beam selector switch is switched to an ON position to excite the movable core 36 of the solenoid 34, the movable core 36 moves rearward, and the stay 22B of the shade 22 rotates forward about the rotational axis A to a position where the stay 22B comes into abutment with the lower end face of the displacement control block 26, where the stay 22B is fixed in place at the high beam position as shown in FIG. 4B.

When the shade 22 rotates to the low beam position or the high beam position, an end face 22b of the stay 22B comes into abutment with a bottom of the V-shaped groove 26a, and when this occurs, the transverse displacement of the stay 22B is restricted by both side wall surfaces of the V-shaped groove 26a. Thus, the longitudinal or transverse deflection of the shade 22, which otherwise may occur because of vibrations while vehicle is running, is prevented. Additionally, the displacement control spring 28 securely fitted on a front end of the projecting portion 20e of the reflector 20 is formed such that the spring extends along a bottom surface of the projecting portion 20e in a U-shaped fashion and is designed to deform elastically when it comes into abutment with the end face 22b of the stay 22B when the shade 22 rotates to reach the high beam position. Thus, this is designed not only to prevent the generation of unnecessary striking noise when beams are switched but also to eliminate looseness at connecting portions between the stay 22B and the shaft member 42 and between the stay 22B and the movable core 36 of the solenoid 34 and looseness of the movable core 36 itself.

As shown in FIG. 2, a pair of black stripes (light screening films) 18c is formed on the outer circumferential surface of a shroud tube 18b of the discharge bulb 18 in such a manner as to extend in the optical axis Ax direction. The circumferential width of the respective black stripes 18c is set at 25 degrees and the central angle between upper end edges of the respective black stripes 18c is set at 195 degrees. Then, the discharge bulb 18 is attached to the reflector 20 so that one of the upper end edges of the two black stripes 18c is positioned on a horizontal plane passing through the optical axis Ax.

Areas D1 shown on the reflecting surface 20a of the reflector by inclined solid lines rising rightwardly are those which are located behind the two black stripes 18c, and hence, light from the discharge illuminant portion 18a is not permitted to enter the areas even when the discharge bulb 18 is illuminated (non-used areas). On the other hand, an area M shown on the reflecting surface 20a by inclined broken lines rising leftwardly is an area which comes behind the shade main body 22A when the shade 22 is located at the low beam position, and hence, light from the discharge illuminant portion 18a is not permitted to enter the area. However, the area M does not come behind the shade main body 22A when the shade is located at the high beam position, and hence, light from the discharge illuminant portion 18a is permitted to enter the area (an area exclusively used for the high beam). Furthermore, an area D2 shown on the reflecting surface 20a by inclined solid lines rising leftwardly is an area which is located behind the shade main body 22 not only when the shade 22 is located at the low beam position but also when the shade 22 is located at the high beam position, and hence, light from the illuminant portion 18a is not permitted to enter the area (a non-used area). An area B shown on the reflecting surface 20a as a blank area where no inclined line is shown is an area where light from the illuminant portion 18a is permitted to enter both when the shade 22 is located at the low beam position and when the shade 22 is located at the high beam position (a shared area).

Figure 5A:
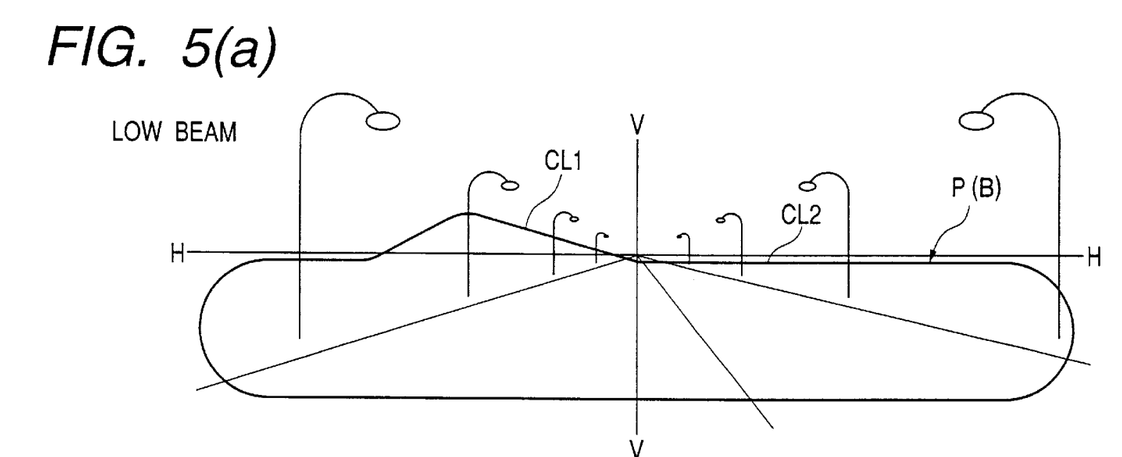
FIG. 5 is a diagram showing a light distribution pattern given off by the Vehicle headlamp according to an embodiment of the invention.
Figure 5B:
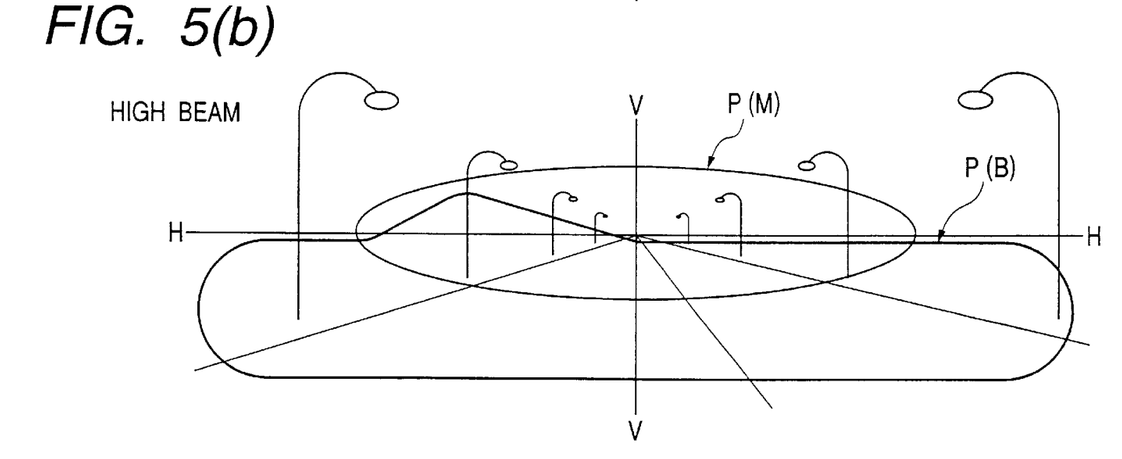

FIG. 5 shows light distribution patterns given off by the Vehicle headlamps 10 according to an embodiment of the invention. FIG. 5A is a light distribution pattern for the low beam, whereas FIG. 5B is a light distribution pattern for the high beam.

The light distribution pattern for the low beam is a light distribution pattern given off by the headlamps when the shades 22 are located at the low beam positions. This low beam light distribution pattern is constituted by a light distribution pattern P (B) formed by reflected light from the shared area B. On the other hand, the light distribution pattern for the high beam is a light distribution pattern given off by the headlamps when the shades 22 are located at the high beam position. This high beam light distribution pattern is constituted by the light distribution pattern P (B) and a light distribution pattern P (M) formed by reflected light from the area M exclusively used for the high beam on the reflecting surface 20a of the reflector 20. The light distribution pattern P (B) and the light distribution pattern P (M) partially overlap with each other.

As shown in FIG. 5A, the low beam light distribution pattern has inclined and horizontal cut-off lines (border lines between bright and dark areas) CL1, CL2, and these cut-off lines CL1, CL2 are formed as inverted images of border lines L1, L2 between the shared area B and the non-used area D1.

As has been described above, the Vehicle headlamp 10 according to the invention comprises the beam switching device 24 for switching between the low beam and the high beam by rotating the shade 22 for screening part of incident light given off from the discharge illuminant portion 18a to the reflecting surface 20a of the reflector 20 between the two positions each providing a different degree of light screening. Since the beam switching device 24 is constructed so as to rotate the shade about the rotational axis A, which is inclined at a predetermined angle of Θ relative to the horizontal plane, the following function and advantage can be obtained.

The rotational locus of the shade 22 can be inclined relative to the vertical plane by inclining the rotational axis A of the shade 22 relative to the horizontal plane. This allows the beam switching device to be inclined relative to the vertical plane. Therefore, as shown in FIG. 3, a vertical distance h from the optical axis Ax to a lower end position of the beam switching device 24 can be made shorter.

Consequently, according to an embodiment of the invention, in the Vehicle headlamp constructed such that beams are switched by rotating the shade, the beam switching device can be incorporated in the headlamp without making the headlamp unnecessarily large.

In particular, in this embodiment, since the inclination angle Θ of the rotational axis A relative to the horizontal plane is set at 50 degrees, as shown in FIG. 2, the expanding portion 20b of the reflector 20 to which the beam switching device 24 is attached can be disposed so as not to interfere with the border line L1 on the reflecting surface 20a. Hence, the inclined cut-off line CL1 of the low beam light distribution pattern shown in FIG. 5A can be prevented from becoming unclear. However, as in the case of the embodiment in which the stay 22B of the shade 22 extends in the radial direction relative to the optical axis Ax, even if the inclination angle is not set at 50 degrees but set at any value within a range of 30 to 60 degrees, the vertical dimension h can be made short without adversely affecting the light distributions of the lamp.

Additionally, in this embodiment, since the beam switching device 24 is disposed relative to the optical axis Ax on the side where the border line L1 for forming the inclined cut-off line CL1 exists, the area M exclusively used for the high beam can be secured below the border line L2 for forming the horizontal cut-off line. Thus, the light distribution pattern P (M), and hence, the high beam light distribution pattern can be made brighter to that extent. However, the beam switching device may be disposed on the reflector 20 relative to the optical axis Ax on the side where the border line L2 for forming the horizontal cut-off line exists. If this construction is adopted, the advantage that the high beam light distribution pattern is made brighter is sacrificed. However, since the border ling L2 is located above the border line L1, the inclination angle Θ can be set at a larger value without adversely affecting the light distributions of the lamp. Thus, the vertical dimension h can be made much shorter.

As in the case of the embodiment in which the rotational axis A of the shade 22 is inclined relative to the horizontal plane, the non-light incident area of the reflecting surface 20a of the reflector 20, where light from the discharge illuminant portion 18a is not permitted to enter, varies as the shade 22 rotates. However, as shown in FIG. 2, since the area M exclusively used for the high beam (i.e., the non-light incident area when the shade is located at the low beam position) is set such that the area becomes larger at the reflecting surface 20a2 on one side of the optical axis Ax than at the reflecting surface 20a1 on the other side where the rotational axis A is disposed, not only the area M exclusively used for the high beam can be used as a light incident area when the shade 22 is located at the high beam position, but also the rotational angle of the shade 22 needed for switching the beams can be set to a small value Thus, the beam switching device 24 can be made compact.

Figure 6:
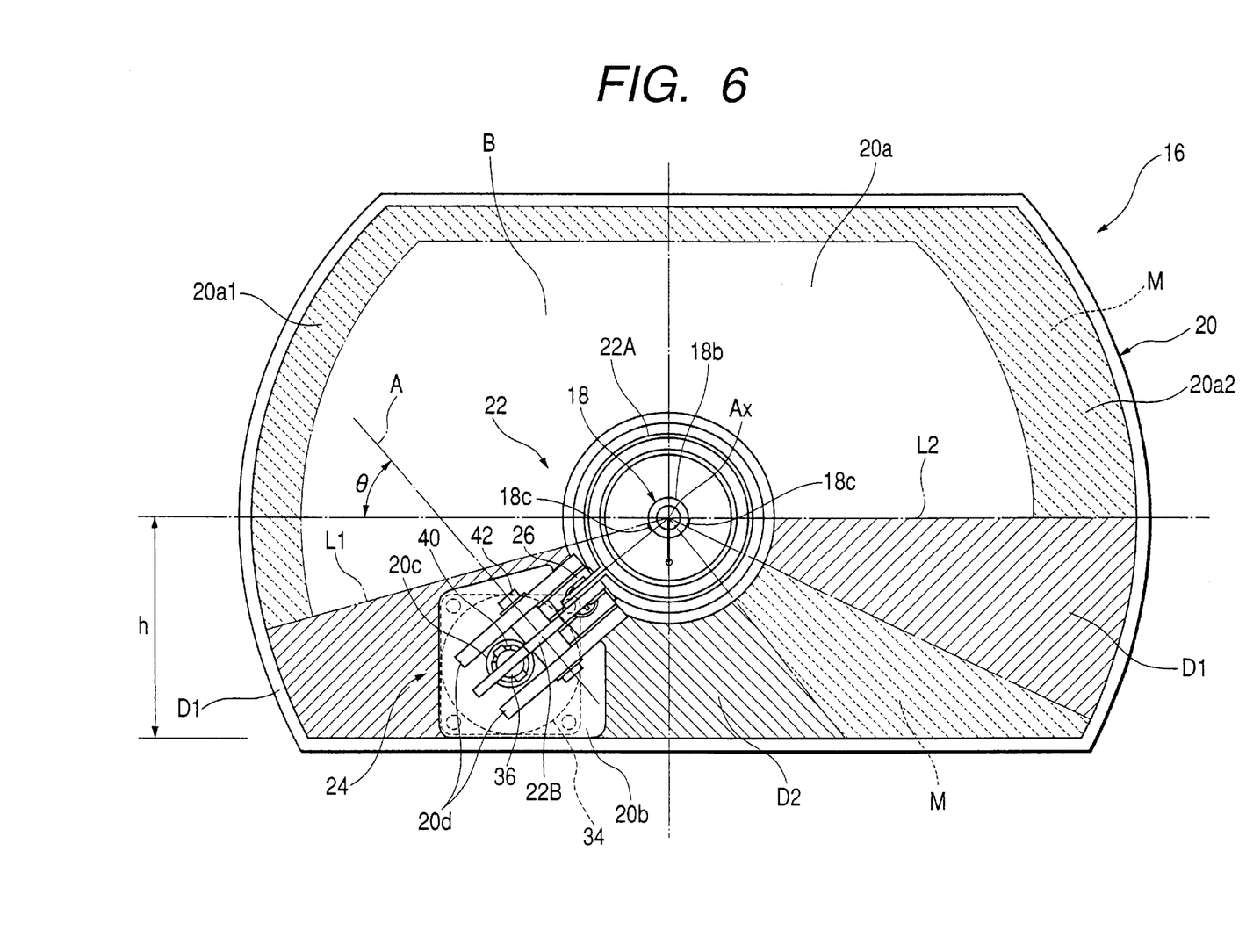
FIG. 6 is a similar view to FIG. 2, showing a modification according to an embodiment of the invention.

In the above embodiment, the outside diameter of the reflecting surface 20a of the reflector 20 is equal at the left and right reflecting surfaces 20a1 and 20a2, and the outside diameter of the shared area B is set to different values for the reflecting surfaces 20a1, 20a2 (i.e., the outside diameter of the shared area of B at the reflecting surface 20a2 is larger than that at the reflecting surface 20a1). However, as shown in FIG. 6, if the outside diameter of the reflecting surface 20a of the reflector 20 differs between the left and right reflecting surfaces, the beam switching device 24 may be disposed on the reflecting surface 20a1 side where the outside diameter is smaller. The outside diameter of the shared area B may be set equal at the left and right reflecting surfaces 20a1, 20a2. In this case, the area M exclusively used for the high beam can be set such that the area becomes larger on the reflecting surface 20a2 side than the reflecting surface area 20a1 side where the rotational axis A is disposed.

Additionally, in this embodiment, the inclination angle Θ of the rotational axis A of the shade 22 relative to the horizontal plane is set at 50 degrees, and the stay 22B of the shade 22 extends straight in the radial direction. However, other construction other than this construction may be adopted.

Figure 7:
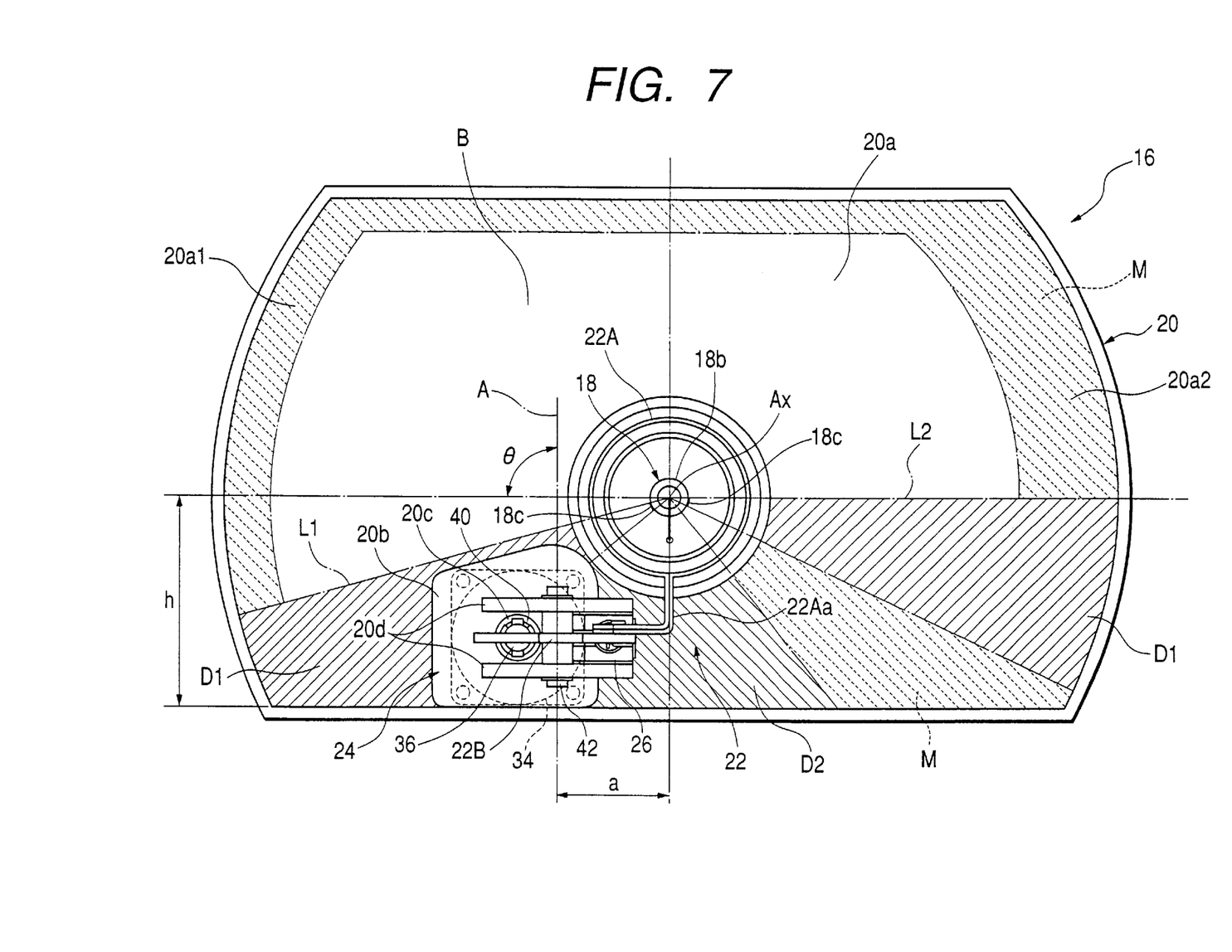
FIG. 7 is a similar view to FIG. 2, showing another modification according to an embodiment of the invention.

For example, as shown in FIG. 7, the inclination angle Θ of the rotational axis A of the shade 22 relative to the horizontal plane is set at 90 degrees, and a connecting portion 22Aa to the stay 22B of the shade main body 22A may be formed into a construction bent in an L-shape (or the stay 22B itself may be formed into a construction bent in an L-shape). However, when this is adopted, the shade main body 22A needs to be disposed such that the rear end edge configuration thereof takes the same positional relationship relative to the reflecting surface 20a of the reflector 20 as that of this embodiment.

Even if the above described constructions are adopted, functions and advantages identical to those of the foregoing embodiments can be obtained. Moreover, in a case where those constructions are adopted, the vertical dimension h from the optical axis Ax to the lower end position of the beam switching device 24 can be made much shorter than in the above embodiment. In addition, when those constructions are adopted, with the vertical dimension h being maintained constant, a rotational lever length a of the shade 22 can be set to any length within some extent Thus, the area ratio of the area M exclusively used for the high beam can be set suitably to different values between the reflecting surface 20a1 side where the rotational axis A is disposed and the other reflecting surface area 20a2. If the rotational lever length a is set at a shorter value, the area ratio of the area M exclusively used for the high beam of the reflecting surface 20a2 relative to the reflecting surface 20a1 can be made larger. Whereas if the rotational lever length a is set at a longer value, the same area ratio can be made smaller.

In the respective modified examples of the embodiment although the shade main body 22A of the shade 22 is formed into the cylindrical configuration with the front end being open, the front end may be formed as closed. Therefore, forward moving light which is directly emitted from the discharge illuminant portion 18a can securely screened. Alternatively, even if another shade is provided near the front of the shade 22 to cover the shade 22, forward moving light which is directly emitted from the discharge illuminant portion 18a can also securely be screened.

The present invention claims priority from Japanese patent application serial no. H11-289399, which is incorporated herein by this reference in its entirety.

Several embodiments of the invention have been described herein, but it should be understood that various additions and modifications could be made which fall within the scope of the following claims.

What is claimed is:

1. A vehicle headlamp comprising:

a light source;

a reflector for reflecting light from said light source;

a shade for screening part of incident light given off from said light source to said reflector;

a beam switching device for switching between a low beam and a high beam by rotating said shade between two positions each providing a different degree of screening of said incident light by said shade; wherein said beam switching device is constructed to rotate said shade about a rotational axis that is inclined a predetermined angle between 30 to 60 degrees relative to a horizontal plane.

2. The vehicle headlamp as set forth in claim 1, wherein a non-light incident area, where the light from said light source is not permitted to enter the reflector when said shade is located at a low beam position, is set such that said area is larger at one side of a reflecting surface of said light source on said reflector than at the other side of the reflecting surface where said rotational axis is disposed.

3. The vehicle headlamp as set forth in claim 1, wherein a non-light incident area, where the light from said light source is not permitted to enter the reflector when said shade is located at a low beam position, is set such that said area is larger at one side of a reflecting surface of said light source on said reflector than at the other side of the reflecting surface where said rotational axis is disposed.

4. A vehicle headlamp comprising:

a light source;

a reflector backing said light source for reflecting light from said light source forwardly;

a shade disposed in front of the light source for screening light from said light source;

a beam switching device disposed below said shade for switching between a low beam position and a high beam position by rotating said shade;

wherein said beam switching device is constructed to rotate said shade about a rotational axis that is inclined a predetermined angle between 30 to 60 degrees relative to a horizontal plane.

5. The vehicle headlamp as set forth in claim 4, wherein the reflector has a surface area where the light from said light source does not enter when the shade is at the low beam position; and a greater portion of said surface area is present at one side of the reflector than the other side of the reflector where said rotational axis is disposed.

6. The vehicle headlamp as set forth in claim 4, wherein said beam switching device rotates the shade toward the reflector.

7. The vehicle headlamp as set forth in claim 4, wherein said beam switching device is diagonally disposed below said shade and rotates the shade toward the reflector.

8. The vehicle headlamp as set forth in claim 4, wherein said shade comprises:

a cylindrical body disposed in front of the light source; and a plate-like stay extending from the cylindrical body, said stay being fixed to said cylindrical body.

9. The vehicle headlamp as set forth in claim 4, wherein said beam switching device comprises:

a solenoid with a movable core; and a return spring attached to the movable core to bias the movable core to return to a non-excited position.

10. The vehicle headlamp as set forth in claim 9, wherein said shade comprises:

a cylindrical body disposed in front of the light source; and a plate-like stay extending from the cylindrical body, said stay being fixed to said cylindrical body;

wherein said stay and said movable core are connected so that the movement of the core translates to rotate said shade about the rotational axis.

11. The vehicle headlamp as set forth in claim 4, wherein said shade comprises:

a cylindrical body disposed in front of the light source;

a connecting portion attached to said cylindrical body at one end; and a plate-like stay connected to said connection portion at the other end.

12. The vehicle headlamp as set forth in claim 11, wherein said beam switching device comprises:

a solenoid with a movable core; and a return spring attached to the movable core to bias the movable core to return to a non-excited position;

wherein said stay and said movable core are connected so that the movement of the core translates to rotate said shade about the rotational axis.

13. The vehicle headlamp as set forth in claim 12, wherein the connecting portion is bent to an L such that the stay is parallel to the horizontal plane.

14. The vehicle headlamp as set forth in claim 13, wherein the rotational axis is inclined substantially 90 degrees relative to the horizontal plane.

* * * * *